Figure 1:
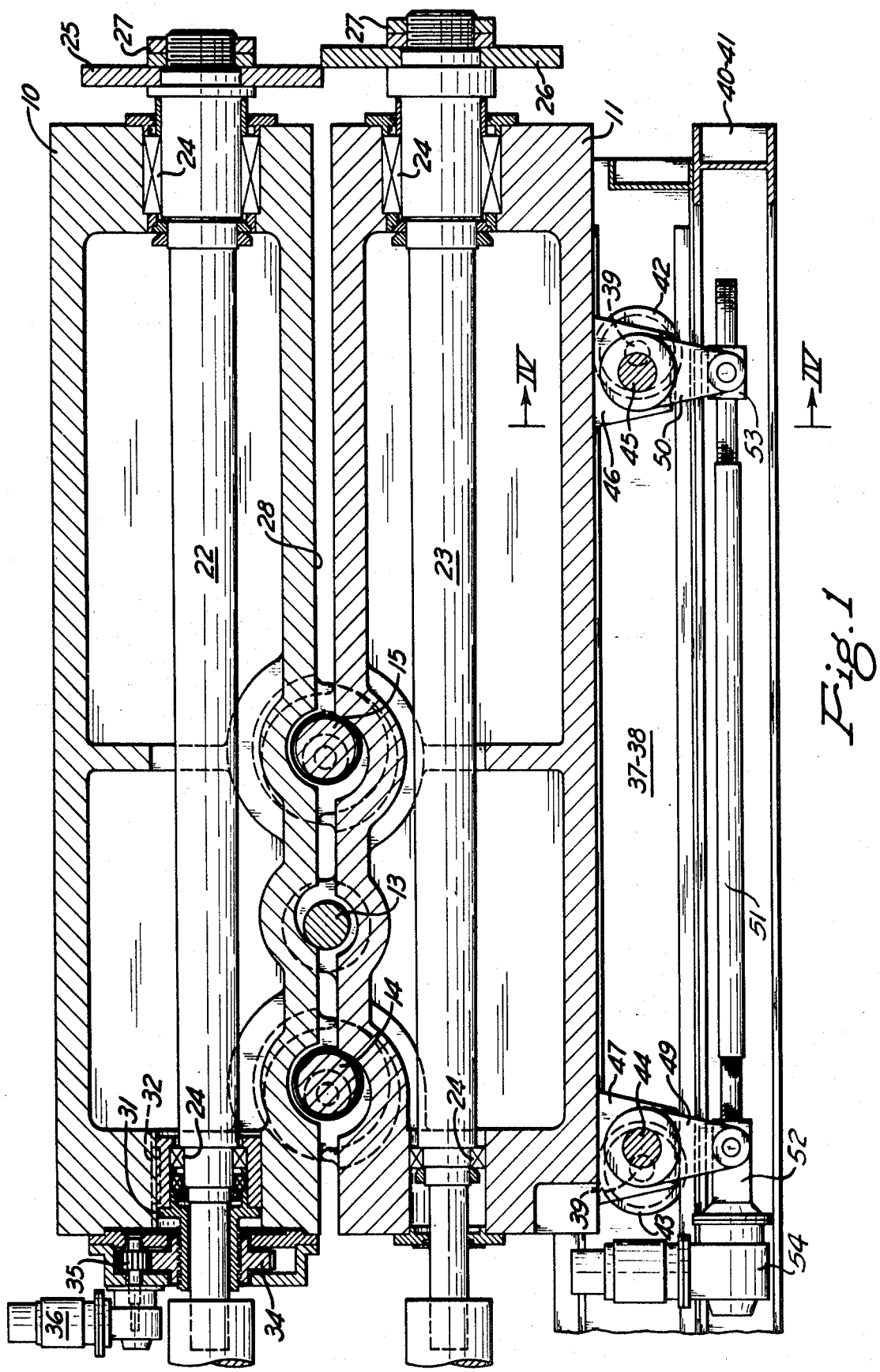

United States Patent

[11] 3,603,190

| | | | | | | |
|---|---|---|---|---|---|---|
| [72] | Inventor | George P. Kollen Pittsburgh, Pa. | | 2,776,710 | 1/1957 | Homery et al. ............... 83/499 X |
| [21] | Appl. No. | 851,788 | | 3,272,042 | 9/1966 | Haas............................. 83/498 X |
| [22] | Filed | Aug. 21, 1969 | | 3,364,803 | 1/1968 | Senftleben.................... 83/503 |
| [45] | Patented | Sept. 7, 1971 | | 3,491,642 | 1/1970 | Weyant......................... 83/503 |
| [73] | Assignee | United Engineering and Foundry Co. Pittsburgh, Pa. | | | | |
| [32] | Priority | Sept. 26, 1968 | | | | |
| [33] | | Great Britain | | | | |
| [31] | | 45810/68 | | | | |

Primary Examiner—William S. Lawson
Attorney—Henry C. Westin

[54] ROTARY PLATE-SLITTING SHEAR
8 Claims, 4 Drawing Figs.

[52] U.S. Cl.................................................... 83/499, 83/503
[51] Int. Cl..................................................... B26d 1/24
[50] Field of Search.......................................... 83/498, 499, 502, 503, 504

[56] References Cited
UNITED STATES PATENTS
1,783,869  12/1930  Allen............................ 83/503 X

ABSTRACT: The present disclosure relates to a rotary blade slitting shear of the type used in the steel industry to divide strip, sheets, and plate into narrower workpieces. The shear comprises two elongated heads adapted to rotatably carry driving shafts to the ends of which are connected cooperating slitting knives. The heads actually are pivotally supported in which the points of pivots serve also as eccentrics which are driven so that the upper knife can be adjusted relative to the lower knife in a vertical plane. The upper knife is also adjustable axially of its drive shaft, for which reason there is provided a driven sleeve and a motor for moving the sleeve axially. The entire shear is adapted to be raised and lowered to properly position the knives relative to the workpiece to be slit.

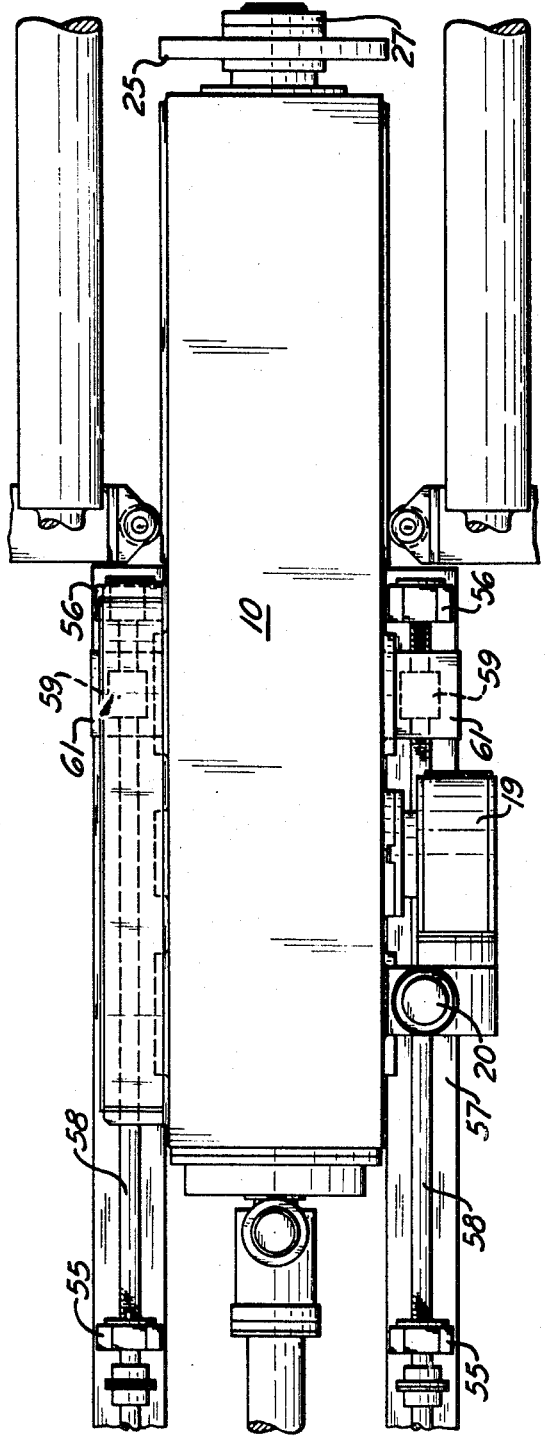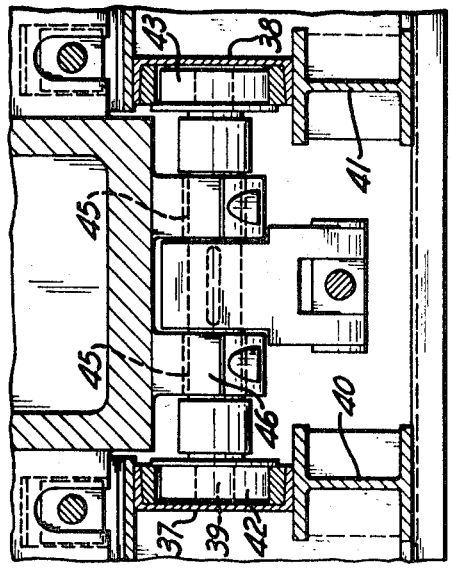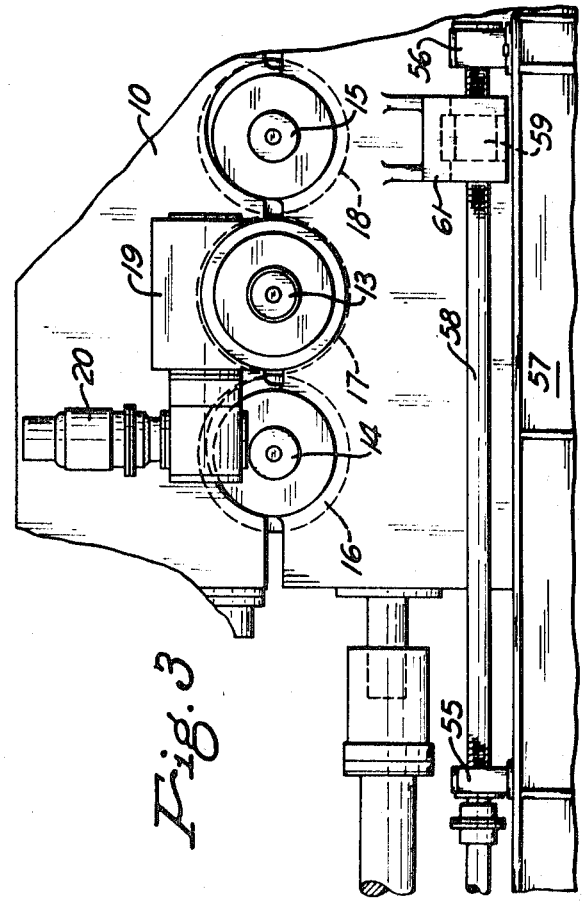

ROTARY PLATE-SLITTING SHEAR

Present-day rotary slitting shears of the type employed to slit lengthwise hot or cold carbon or alloyed plates, which may range from a thickness of three-sixteenths inches to 1 inch and have a width from 36 inches to 150 inches, present very serious limitations. Shears are usually designed with a "C-type" housing in order to accommodate the plate that extends to the shear side of the knives which can amount to 75 inches and present a very cumbersome and a costly construction. For example, the adjustment of the knives is accomplished by providing eccentric sleeves which, of necessity, must be made of a considerable diameter and wherein not only is the adjustment of the shears very limited, but the housing itself that receives the eccentric shafts must, of necessity, be of a very large size. In addition, the sleeves must be very precisely machined in order to obtain the accuracy necessary. The design is further complicated by the need to adjust one of the knives relative to the other in view of the particular eccentric sleeve arrangement discussed above. Many times adjustment of the knives relative to the path of travel of the plates is difficult because of the complicatedness of the overall shear design.

It is a feature of the present invention to provide a rotary slitting shear which will provide each of the necessary adjustments required for a high production shearing line and one that will not only be economical to manufacture but will also be very simple and economical to operate.

More specifically, the present invention provides a slitting shear wherein the design is very compact and wherein there is provided a separate and automatic adjustment of the knives relative to a vertical plane. In addition, adjustment is made of the one knife in an axial direction, the entire shear frame is adjustable and the shear frame may be moved in a transverse direction. A further feature of the present invention is to provide a positive clamping means so that the shear in operation may be held in the precise relationship that is preferred or desired.

These features, as well as others, will be better understood from the following description when read in light of the accompanying drawings, of which:

FIG. 1 is a sectional view of the preferred embodiment of the present invention, FIG. 2 is a partial plan view of the shear shown in FIG. 1, FIG. 3 is a partial elevational view of the shear shown in FIGS. 1 and 2, and FIG. 4 is a sectional view taken along line IV—IV of FIG. 1.

Referring to the drawings, there are illustrated two separate housings 10 and 11 which are joined together through eccentrics 14 and 15, the rotation of which is accomplished through a set of spur gears 16, 17 and 18, shown in FIG. 3, the gear 16 being associated with the shaft 14, the gear 17 with a pin 13, and the gear 18 with the shaft of the eccentric 15. The gear 17 is driven through a worm-wheel unit 19, which is connected to a motor 20 carried by the upper housing 10. The cranks of the eccentrics 14 and 15 form two of the sets of arms of a parallelogram in which there is a clearance between the pin 13 and the housings 10 and 11 to prevent interference upon the movement of the housing 10.

Also shown in FIG. 1, the housings 10 and 11 have identical longitudinally extending shafts 22 and 23 rotatably carried in the housings at the front and back through bearings 24, the left-hand end of which is adapted to rotatably support cooperative knives 25 and 26, which are held on the shaft by nuts 27. It will be seen, in referring to FIG. 1, that the disposition of the knives is such that, with reference to the central opening 28 between the frames 10 and 11, the workpieces can pass substantially within the frames and the housings 10 and 11 with their respective knives 25 and 26 form a cantilever construction with reference to the support shaft 13. By virtue of this construction, on operation of the motor 20 and rotation of the spur gears 16, 17 and 18, the adjustment of the eccentrics 14 and 15 causes a vertical displacement of the upper knife 25.

The upper shaft 22 of the shear is adjustable relative to the housing 10 so as to adjust the longitudinal space between the knives 25 and 26. In referring to the left-hand upper portion of FIG. 1, by virtue of a sleeve 31 which is held in the housing 10 against rotation by a key 32, the construction is such that the sleeve is allowed to move axially but not to rotate. The sleeve axially receives the drive side bearing 24 of the shaft 22 and, outward of the bearing towards the drive, is engaged through the gear teeth with a spur gear 34, the spur gear being, in turn, driven by a drive gear 35, the shaft of which is connected to a reduction motor unit 36. Upon operation of the motor 36, the spur gear 34 will drive the sleeve 31 axially so that the shaft 22 will be moved in an axial direction and the knife 25 will be moved either towards or away from the knife 26 in a longitudinal direction.

As noted previously, it is a feature of the disclosed shear to provide for adjustment of the shear housings 10 and 11 as a unit and, for this purpose, in referring to the lower portion of FIGS. 1 and 4, there is provided a pair of channel beams 37 and 38 which are supported on I-beams 40 and 41. The channels 37 and 38 receive two pairs of wheels 42 and 43, the wheels being joined together by a common axle 39. Also carried on the axle are two spaced-apart pairs of eccentrics 44 and 45, the eccentrics being connected to brackets 46 and 47 extending down from the housing 11. Also connected to the axle 39 are levers 49 and 50 which extend downward of the shear, the opposite ends of which are connected to a common shaft 51. The shaft is received in nuts 52 and 53 carried by the levers 49 and 50 and is driven by a reducer motor unit 54. In the arrangement, by operating the motor 54, the shaft 51 is caused to be displaced, hence, displacing the levers 49 and 50, thereby causing rotation of the eccentrics and a raising and lowering of the housings 11 and, hence, the housing as a unit.

In addition to the entire shear being raised vertically so as to position the cutting zone of the knives in the proper position relative to the path of travel of the workpieces, the shear housings as a unit are adapted to be moved towards and away from the edge of the workpiece. For this purpose, in referring to FIGS. 2 and 3, there are provided two pairs of stationary bearing blocks 55 and 56 connected to the subframe 57 of the shear. The bearing blocks rotatably support shafts 58 to which there are mounted nuts 59 that are received in downwardly extending brackets 61 connected to the lower shear housing 11. The shaft 58 is driven by a motor (not shown), the operation of which causes a movement of the nut over the shaft 58 and, hence, a corresponding movement of the shear housing 11 in a direction towards and away from the edge of the plate.

In order to assure that the shear will be positively held in this desired position during operation, there may be provided a clamping mechanism for positively maintaining the various preset positions.

In accordance with the provisions of the patent statutes, I have explained the principle and operation of my invention and have illustrated and described what I consider to represent the best embodiment thereof.

I claim:

1. A shear comprising:
   first and second knife frames,
   first and second driven shafts rotatably supported by said first and second frames, respectively,
   knives secured to the one end of each of said shafts and arranged to cooperate together to shear striplike material fed between the knives,
   means for driving said first and second shafts,
   an eccentric means for pivotally supporting one of said frames in a manner to allow the supported frame and its knife to be displaced towards and way from the other frame and its knife, and
   means for causing said displacement of said one frame.

2. A shear according to claim 1 wherein said first and second shafts overhang one end of their respective frames and including means for mounting said knives on said overhanging ends, said eccentric means comprising a pair of spaced-apart eccentrics having their axes in a common plane, and said means for causing said displacement including means for driving said eccentrics in the same rotational direction to cause a pivoting of said one frame.

3. In a shear according to claim 2 wherein said frames and eccentrics constitute four links and which are interconnected to form a parallelogram.

4. In a shear according to claim 2 including a gear mounted on each of said eccentrics, a pinion intermeshing with said gears, and wherein said means for driving said eccentrics is connected to said pinion.

5. In a shear according to claim 2 wherein said one frame comprises the upper frame of said shear and the other frame comprises the lower frame thereof, and means associated with said lower frame for causing a vertical displacement of said lower and upper frames as a unit.

6. In a shear according to claim 5 wherein said means for causing vertical displacement of said frames as a unit comprises a second pair of eccentrics engageable with said lower frame, and means for rotating said second pair of eccentrics.

7. In a shear according to claim 5, including two pairs of wheels secured to said lower frame, a pair of tracks engaged by said wheels and allowing the lower and upper frames as a unit to move horizontally in a direction towards and away from one of the edges of the striplike material, and means for moving said lower frame horizontally.

8. In a shear according to claim 5, including means for displacing one of said driven shafts in a direction parallel to its axis so as to vary the spacing between said knives, and said means comprising a drive means and including a threaded member secured to said one driven shaft.